2,601,822

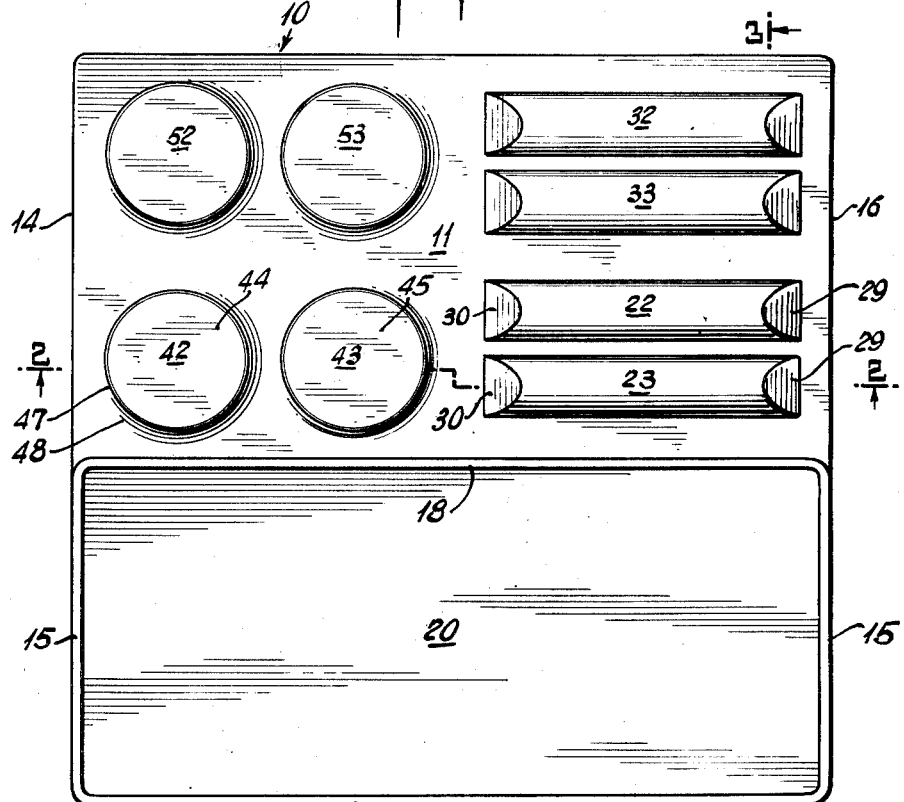
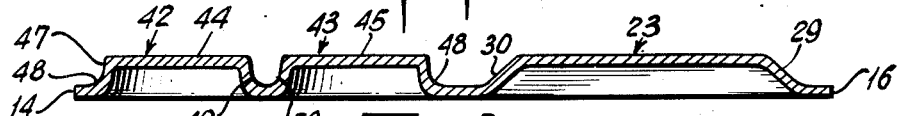
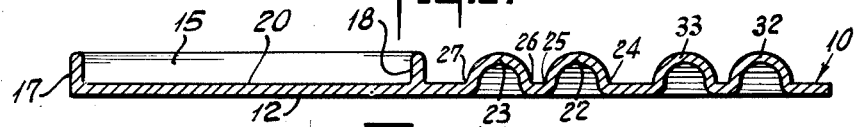
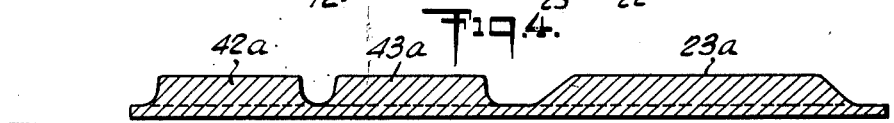
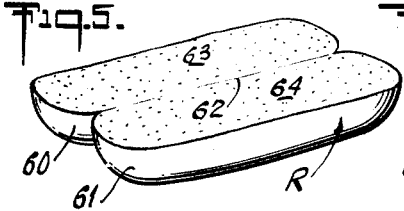
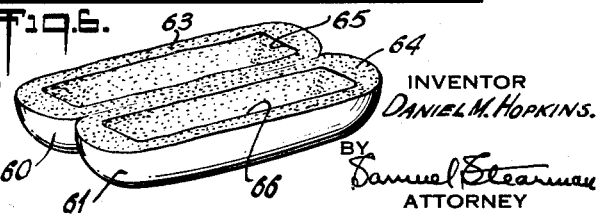
INVENTOR
DANIEL M. HOPKINS.
BY
ATTORNEY Patented July 1, 1952

UNITED STATES PATENT OFFICE 2,601,822

APPLIANCE FOR USE IN MAKING FRANKFURTER AND HAMBURGER SANDWICHES

Daniel M. Hopkins, Bridgeport, Conn., assignor to Stuart H. Ralph, Westport, Conn.

Application September 2, 1949, Serial No. 113,853

4 Claims. (Cl. 99—339)

This invention relates to a device for use in the preparation of frankfurter and hamburger sandwiches.

In the customary procedure of preparing and serving frankfurter or hamburger sandwiches, the usual elongated or round roll, as the case may be, is sliced along one side so as to form two halves hinged to one another along the opposite side, and the grilled frankfurter or hamburger meat portion is inserted between the two halves along with such relish, sauce or condiment as may be desired.

Frankfurter and hamburger sandwiches thus prepared and served are difficult to handle, not only because of their inordinate thickness due to the cross-sectional thickness of the meat portion, but also because of the tendency of the meat portion, especially in the case of frankfurters, to become displaced from position between the two halves of the roll. Frequently this results in loss of part of the sandwich.

To overcome the foregoing objections, it has heretofore been proposed to provide, for use in sandwiches of this type, rolls that are initially, in the process of baking thereof, made hollow or tubular so as more readily to receive the meat portion of the sandwich therewithin and form a sandwich of convenient size for handling during the eating thereof, and such that it will not tend to separate and fall apart.

These prior proposals, as above indicated, contemplate the production of hollow or tubular baked rolls to replace the usual split rolls for use in making frankfurter or hamburger sandwiches. They accordingly entail the baking of special forms of rolls for this purpose, requiring the use of specially constructed baking pans or devices at the bakeries, in departure from the practises entailed in the baking of the conventional forms of rolls. Moreover, the hollow or tubular forms of rolls produced by baking the dough in such form according to those prior proposals, tend to become stale more rapidly than the conventional rolls, during the period they are in transit and storage between completion of the baking thereof and the moment they are used in making the sandwich therewith. It is apparently for the foregoing reasons that none of these prior proposals has, so far as I am aware, gained adoption in actual commercial usage.

The principal object of my invention is to provide an appliance for use in the preparation of frankfurter and hamburger sandwiches and which, so far as the roll member of the sandwich is concerned, embodies means for toasting a sliced or split conventional roll used in making such sandwiches, and for simultaneously forming in each half of the thus sliced or split roll, a depression of such shape and size as readily to receive therein and conform to the shape of the meat portion of the sandwich, so that the resultant sandwich is not only neat and compact, without tendency to separate and lose any of its contents, but also more tasty than usual. Thus, my invention makes possible the preparation of sandwiches of this character without requiring special devices for the baking of the roll, or departures from conventional practises at the bakeries where such rolls are commercially produced.

Another object of the invention is to provide an appliance of the character above set forth, which may be adapted for household use as well as for use by institutions and commercial establishments engaged in preparing and serving relatively large numbers of such sandwiches in short periods of time.

Another object of the invention is to provide an appliance of the character above set forth which also embodies means for grilling the frankfurters and hamburgers to be used in forming the sandwiches.

These and other objects of the invention, as well as the advantages thereof, will become more fully apparent from the detailed description herebelow and from the accompanying drawings in which:

Fig. 1 is a view in plan, showing one embodiment of the invention;

Fig. 2 is a view in cross-section taken along line 2—2 of Fig. 1;

Fig. 3 is a view in cross section taken along line 3—3 of Fig. 1;

Fig. 4 is a cross-sectional view showing a modified form of the invention;

Fig. 5 is a perspective view, showing a conventional form of frankfurter roll after the same has been sliced or split along one side thereof to form the same into two halves hinged to one another, in readiness to be applied to the device of my invention for toasting and forming the depressions in each of the halves; and Fig. 6 is a perspective view, showing the roll of Fig. 5 after it has been toasted and formed with the depressions in each half thereof.

Referring first to Figs. 1 to 3, there is shown an embodiment of the invention in a form suitable for household use. In the form there illustrated, the device, indicated generally by the numeral 10, comprises a rectangular or square plate member 11 having a flat bottom surface 12 for resting the device over a flame or other convenient heating means. A substantial portion of each side edge 14, 16 of the plate member is formed as a rim or shallow wall 15 extending vertically upward from the plate member. A similar wall 17 extends between the walls 15 and joins with the latter at one end thereof. The opposite ends of the walls 15 are similarly joined with a similar vertically extending wall 18 parallel to the wall 17. Thus, the upper surface of the plate member bounded by the walls 15, 17, 18 provides a confined area 20 on which may be placed the meat portion of a sandwich, such as frankfurters or hamburgers, for grilling the same.

In spaced relation to the wall 18, and on the side thereof opposite the meat grilling area 20, the upper surface of the plate member is formed with a pair of elongated, cross-sectionally convex, parallel embossments 22, 23 of a length somewhat less than that of the well known commercial form of frankfurter roll, and of a width between the lines indicated at 24, 25, or 26, 27 at which the convex upper surface of the embossments 22, 23 respectively merge into the surface of the plate member, likewise somewhat less than the normal width of such frankfurter rolls. Preferably, the end faces 29, 30 of the embossments extend at angles upwardly and inwardly inclined toward one another. The embossment 22 is spaced from the embossment 23 a distance small enough to permit a split, incompletely halved frankfurter roll to be positioned with the cut surface of one of such halves directly over and in firm contact with the upper surface of the embossment 22 and the cut surface of the other of such halves directly over and in firm contact with the upper surface of the embossment 23, without tearing or otherwise separating the two halves of the roll from one another. In terms of specific measurement, the embossments 22, 23 may conveniently be made approximately four to five inches long (measured along the base thereof) and with a convex surface of approximately one-half inch radius, and the embossments may be spaced from each other a distance, measured between the lines indicated at 25 and 26, of approximately one-quarter of an inch.

A second pair of embossments 32, 33 of shape, dimensions and spacing substantially identical with those of the embossments 22, 23 are formed on the plate member 11. This second pair may be spaced from the first pair at any convenient distance, this spacing however, being somewhat greater than the spacing between the individual embossments of each pair.

The upper surface of the plate member 11 is also formed, on the side thereof opposite the meat grilling area 20 and in spaced relation to the latter, with a pair of circular embossments 42, 43 the top surfaces 44, 45 of which are each of an area somewhat less than the area presented by the surface of a conventional hamburger roll when sliced in half. The surfaces 44, 45 lie in a common plane which, preferably, extends the same distance above the surface of the plate member 11 as the radius of the convex surfaces of the embossments 22, 23, 32, 33. The peripheral side wall 47 of each of the embossments 42, 43 extends substantially at a right angle to the surfaces 44, 45 but merges at the base portion thereof with the surface of plate member 11 preferably along a curved surface 48 as more particularly shown in Fig. 2. Embossment 42 is spaced from embossment 43 a distance such as will enable a split, incompletely halved hamburger roll to be positioned with the cut surface of one of such halves in contact with the surface 44 of embossment 42 and with the cut surface of the other of such halves in contact with the surface 45 of embossment 43, without tearing or separation of the two halves of the roll from one another. For this purpose the distance between these embossments should be approximately one-half of an inch measured between the points 49, 50 indicated in Fig. 2.

A second pair of circular embossments 52, 53 of substantially the same shape, dimensions and spacing as the embossments 42, 43 are formed on the plate member 11, at a conveniently spaced distance from the pair first described, the pair 52, 53 being, however, spaced from the pair 42, 43 at a distance somewhat greater than the spacing between the individual embossments of each pair.

The device 10 in the form above described may be formed as a single-piece stamping or casting from any suitable metal or alloy of approximately $\tfrac{3}{16}''$ thickness, according to well-known methods. In the embodiment more particularly illustrated in Figs. 2 and 3, the several embossments are hollow on the interior thereof, but they may, if desired, be made solid, as indicated by the reference characters 23a, 42a and 43a in Fig. 4.

The device as thus constructed may be heated in any desired manner, as by supporting the same directly over the flame of a gas burner or the like. When it has attained the desired temperature, frankfurters or hamburgers, or both simultaneously, may be grilled on the area 20, and when they are about ready for serving in the form of sandwiches in the customary frankfurter or hamburger rolls, as the case may be, the rolls are sliced in the usual manner to leave the two halves of the roll connected to one another along the unsliced edge, and the sliced surfaces of the roll are placed over and in firm contact with the upper surfaces of a pair of the appropriate embossments. The heat applied to the device to maintain the area 20 at a satisfactory meat grilling temperature will be quite ample to maintain the surfaces of embossments at a temperature adequate for very rapidly toasting the sliced surface of each half of the roll, at the same time forming therein a depression corresponding substantially in shape and size to the shape and size of the depression and such as to receive and conform to the shape of the grilled frankfurter or hamburger. With the grilled frankfurter or hamburger placed within and partially surrounded by the toasted depression in one half of the roll, the other half thereof may be swung about the uncut hinge portion so that the toasted surface of the depression therein will be in partial surrounding relation to the portion of the frankfurter or hamburger extending above the depression in the first mentioned half of the roll. Thus there is formed a neat, compact, easy-to-handle and, withal, tasty sandwich, free of the tendency common with the customary frankfurter and hamburger sandwiches to become separated during handling and eating, with loss of part or all of the contents of the roll.

In Fig. 5 there is shown a conventional form of frankfurter roll R, sliced from one side thereof to provide two halves 60, 61 hinged to one another along the uncut portion as indicated at 62 in accordance with the customary practice in serving frankfurter sandwiches. Fig. 6 depicts this roll as it appears after the surfaces 63, 64 have been subjected to firm contact for several seconds with the hot surfaces of one of the pairs 22, 23 or 32, 33 of elongated embossments shown in Figs. 1–3. The depression formed in the surface 63 of the roll by one of the embossments of the pair is indicated at 65, and the depression formed in the surface 64 of the roll by the other embossment of such pair is indicated at 66. The surfaces of these depressions present the usual golden brown appearance of toasted bread. It is a characteristic feature and advantage of the invention that the device as herein described is capable of transforming the usual sliced roll such as shown in Fig. 5 to the form depicted in Fig. 6 and more particularly above described, within a matter of two to five seconds time after the sliced roll is placed in firm contact with the hot surfaces of the pair of embossments 22, 23 (or 32, 33). Thus, two pairs of such elongated embossments for use in connection with frankfurter rolls and two pairs of circular embossments for use in connection with hamburger rolls will be adequate in the device designed for household use, considering the relative size of the meat grilling area 20 and the relatively longer time required for grilling the meat. This same arrangement may also suffice for certain institutional and commercial use, although it will be apparent that for the last named uses the device may be constructed with more than two pairs of each of such embossments and a correspondingly larger meat grilling area 20. It will be further apparent that the arrangement of the embossments with relation to the meat grilling area 20 may also be modified from that shown, so long as the the meat grilling area is separated by a vertically extending wall or walls such as indicated at 18 from the area or areas of the plate member on which the roll toasting and depression-forming embossments are formed.

I claim:

1. A cooking utensil formed from a metal heat-conducting substantially flat plate member, said member comprising two integral portions in heat-conducting relationship whereby heat applied to one of said portions will be transferred by conduction to the other of the portions, and a vertically-extending transverse rib separating the surface of one of said portions from the surface of the other portion and serving to prevent the flow of liquids from one portion to the other, said first-named portion having a smooth, plane surface, said second-named portion being provided with a plurality of upwardly-extending pairs of integral embossments, said pairs of embossments being spaced from each other a substantially greater distance than the distance between the embossments of each pair.

2. A cooking utensil formed from a metal heat-conducting substantially flat plate member, said member comprising two integral portions in heat-conducting relationship whereby heat applied to one of the portions will be transferred by conduction to the other of the portions, and a vertically-extending transverse rib separating the surface of one of said portions from the surface of the other portion and serving to prevent the flow of liquids from one portion to the other, said first-named portion being provided with a plurality of upwardly-extending pairs of integral embossments, said pairs of embossments being disposed in parallel to said rib and being spaced from each other a substantially greater distance than the distance between the embossments of each pair.

3. A cooking utensil formed from a metal heat-conducting substantially flat plate member, said member comprising two integral portions in heat-conducting relationship whereby heat applied to one of the portions will be transferred by conduction to the other of the portions, and a vertically-extending transverse rib separating the surface of one of said portions from the surface of the other portion and serving to prevent the flow of liquids from one portion to the other, said first-named portion having a smooth, plane surface, said second-named portion being provided with a plurality of upwardly-extending pairs of integral embossments, said pairs of embossments being disposed in parallel to said rib and being spaced from each other a substantially greater distance than the distance between the embossments of each pair, and said first-named portion having an end wall and side walls integral with said rib to form an enclosure for said plane surface.

4. A cooking utensil formed from a metal heat-conducting substantially flat plate member, said member comprising two integral portions in heat-conducting relationship whereby heat applied to one of the portions will be transferred by conduction to the other of the portions, and a vertically-extending transverse rib separating the surface of one of said portions from the surface of the other portion and serving to prevent the flow of liquids from one portion to the other, said first-named portion having a smooth, plane surface, said second-named portion being provided with a plurality of upwardly-extending pairs of integral embossments, said pairs of embossments being spaced from each other a substantially greater distance than the distance between the embossments of each pair, the embossments of at least one of said pairs being elongated in outline and the embossments of at least one of said pairs being substantially circular in outline, and said first-named portion having an end wall and side walls integral with said rib to form an enclosure for said plane surface.

DANIEL M. HOPKINS.

REFERENCES CITED

The following references are of record in the file of this patent:

UNITED STATES PATENTS

| Number | Name | Date |
|---|---|---|
| 943,093 | Mueller | Dec. 14, 1909 |
| 1,707,532 | Moon | Apr. 2, 1929 |
| 1,910,620 | Mabey | May 23, 1933 |
| 2,075,474 | Scutt | Mar. 30, 1937 |
| 2,097,356 | Truesdale | Oct. 26, 1937 |
| 2,499,558 | Andrews | Mar. 7, 1950 |